Figure 4:
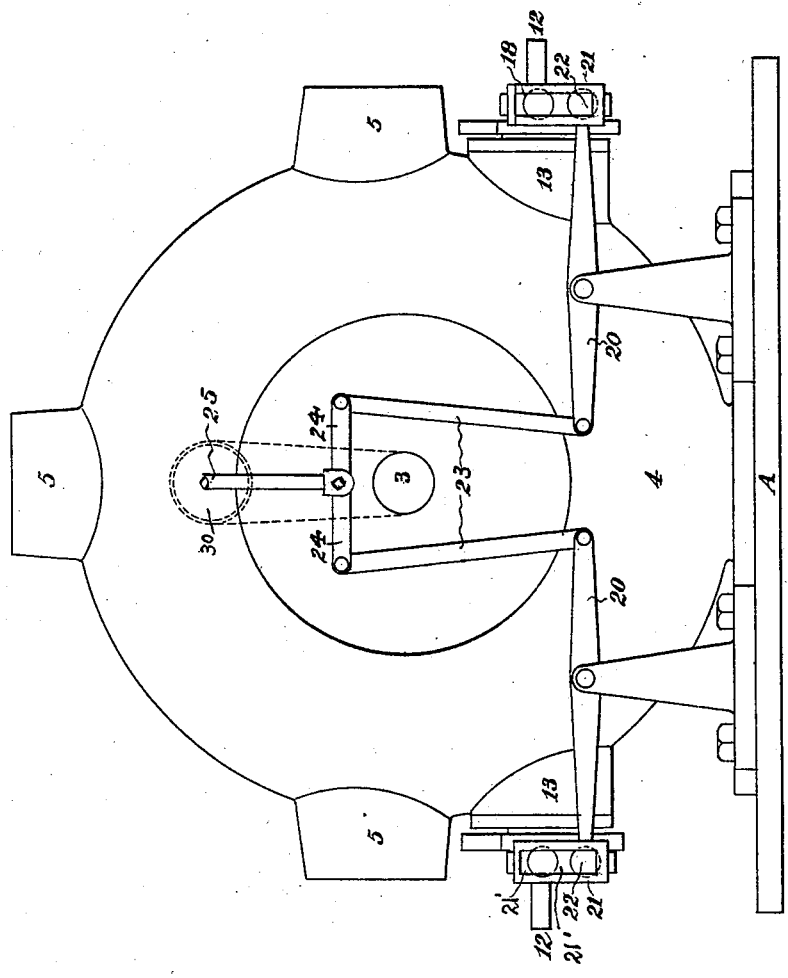

No. 668,801. Patented Feb. 26, 1901.
N. LAMB.
REGULATING DEVICE FOR IMPACT WATER WHEELS.
(Application filed Apr. 2, 1900.)
(No Model.) 2 Sheets—Sheet 1.
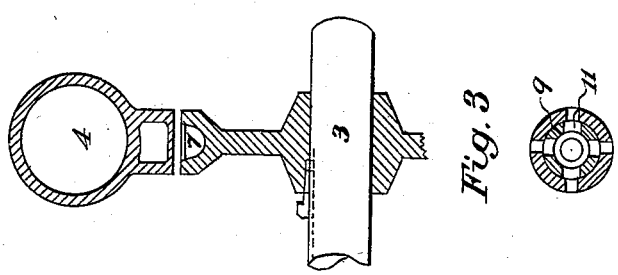
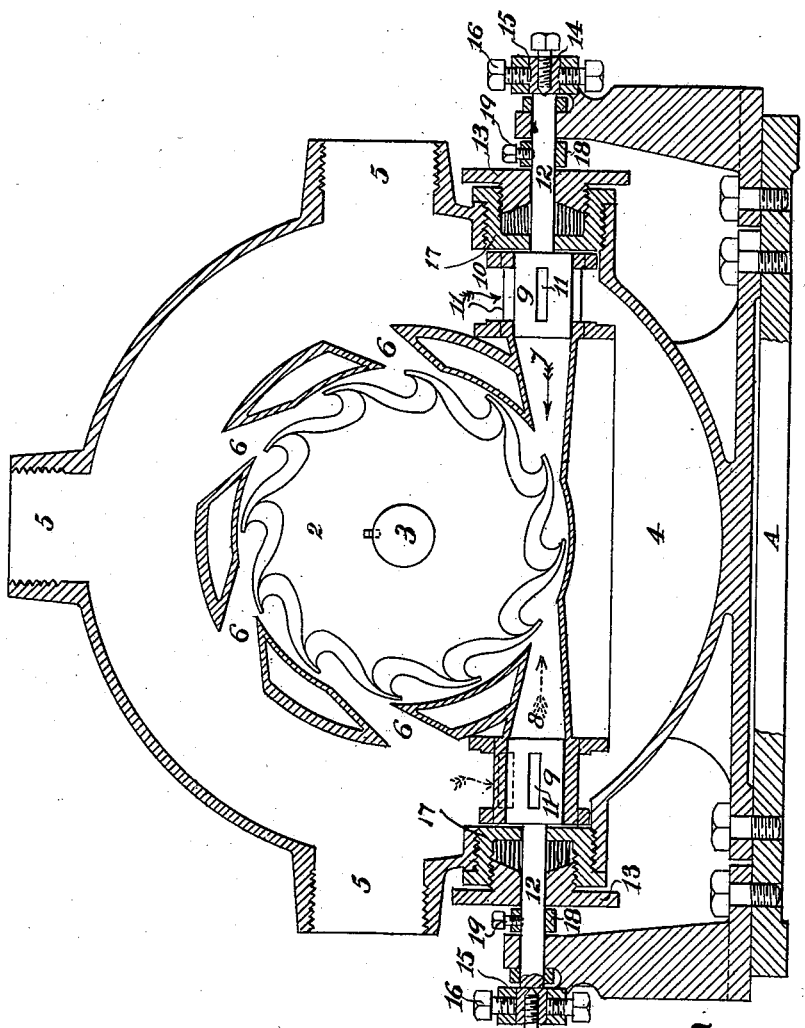

No. 668,801. Patented Feb. 26, 1901.
N. LAMB.
REGULATING DEVICE FOR IMPACT WATER WHEELS.
(Application filed Apr. 2, 1900.)
(No Model.) 2 Sheets—Sheet 2.

Witnesses,
E. A. Brandau

Inventor,
Newton Lamb
Dewey Strong & Co
Attys

UNITED STATES PATENT OFFICE.

NEWTON LAMB, OF YREKA, CALIFORNIA.

REGULATING DEVICE FOR IMPACT WATER-WHEELS.

SPECIFICATION forming part of Letters Patent No. 668,801, dated February 26, 1901.

Application filed April 2, 1900. Serial No. 11,131. (No model.)

*To all whom it may concern:*

Be it known that I, NEWTON LAMB, a citizen of the United States, residing at Yreka, county of Siskiyou, State of California, have invented an Improvement in Regulating Devices for Impact Water-Wheels; and I hereby declare the following to be a full, clear, and exact description of the same.

My invention relates to improvements in water wheels or motors and governors.

It consists of a plurality of nozzles through which water is directed against peripheral projections upon the wheel by which the latter is propelled, with a reverse nozzle through which water may be directed to retard the wheel, means for supplying water to these nozzles, valves within these nozzles, and means for operating the valves of the driving-nozzles and the valve of the retarding-nozzle reciprocally, so that whatever amount of water is shut off from a driving-nozzle is discharged by the reverse or compensation nozzle, all with and for the purpose of varying the speed and power of the wheel proportionately to its load.

My invention also comprises details of construction, which will be more fully explained by reference to the accompanying drawings, in which—

Figure 1 is a vertical section through the wheel at right angles to the shaft. Fig. 2 is a section of a portion of the wheel, taken at right angles to Fig. 1. Fig. 3 is a transverse section through one of the valves. Fig. 4 is a front elevation of the reservoir and governor connections.

In the operation of wheels, especially that class known as "momentum-wheels," in which the water is delivered into the wheel-buckets under a high head or pressure, it is desirable to regulate the speed of the wheel and make it commensurate with the load to be carried.

In order to effect this, I have shown a system of nozzles so arranged as to discharge water upon the wheel at various points around its periphery, and one or more of these nozzles is provided with a valve actuated by the governor, while on the opposite side is a nozzle to direct water against the advancing side of the wheel, which I call a "brake-nozzle." This nozzle is also provided with a valve which is operated in unison with the valve controlling the driving-nozzle, so that as the supply through the driving-nozzle is decreased the supply through the brake-nozzle is increased, and by this means the movement of the water in the pipe will never be choked or disturbed, while the regulation will be more prompt than if deflecting-nozzles are used and with a less waste of water, because instead of being thrown away the water will be projected against the opposite side of the wheel to act directly in checking its movement.

The proportion of driving-nozzles to the brake-nozzle may be varied to suit conditions. As at present shown I have illustrated my invention as provided with five driving-nozzles and one brake-nozzle, which will provide for a variation of nearly fifty per cent. of the load, and that is more than is usually required.

In the drawings, A is a platform or frame upon which the wheel is carried. It may be in the form of a box-frame, so that the wheel-journals will stand low upon it and the wheel may project partially down into the box, and in this construction the governor bearings and supports will also be low and the whole apparatus will be more steady and compact.

2 is the wheel, mounted upon a journal-shaft 3, which turns in suitably-supported boxes at opposite sides, and there is an opening through the frame below the wheel for the free escape of water. Encircling the wheel and separated therefrom a sufficient distance to permit of the introduction of the nozzle is the reservoir or supply-pipe 4. Into this reservoir are openings 5, (there may be one or more,) by which the desired head or pressure is admitted. The object of using the reservoir 4 (which *per se* is not claimed as new) to which to connect the nozzles is that it offers a ready means of water connection between these various nozzles. By using a number of these passages the reservoir may be made smaller in size, and the water entering through so many points will have a shorter distance to travel to the wheel-nozzles 6, through which water is discharged into the buckets 7 of the wheel.

I do not limit myself to any especial construction of wheel or the buckets therefor, as there are many varieties of these wheels, any of which can be used in conjunction with my invention.

The nozzles 6 pass through the inner rim of the reservoir 4, which surrounds the wheel, as shown, and as many of these nozzles may be employed as desired to direct water into the buckets of the wheel for the purpose of propelling it.

8 is a nozzle opening directly against the advancing face of the wheel and in opposition to one of the nozzles 6. I have only shown one of these brake-nozzles 8, because by the connection of its controlling-valve with the controlling-valve of the opposing nozzle 6 I cut off a supply from one of the direct nozzles and throw a similar amount of water into the brake-nozzle, so that the resistance to the wheel will be sufficient for any reasonable variation of load.

The valves 9 are cylindrical in form, turning in inclosing cases 10 within the reservoir 4, and the valves and casings have ports in the sides, as shown at 11, which may be brought to coincide, so as to admit water freely into the interior of the valves; but by turning the valves with relation to the casing-openings these ports may be cut off or reduced in size to any desired extent, as will be hereinafter described. One end of the valve 9 opens directly into its nozzle 6 or 8, and the other end is closed, and a shaft 12 extends axially from it through a stuffing-box 13, which forms a tight joint with relation to the shaft. The outer end of the shaft has a center against which an adjustable screw 14 may be caused to press, being turned, through threads in its support 15, to a proper bearing and then being locked by screws 16. This prevents the backward thrust of the water causing too much friction on the moving parts.

17 is a bushing which is screwed or fitted in the front end of the stuffing-box 13.

The valves are turned by crank-arms 18, which are secured to the shafts 12 by set-screws 19 or like securing devices, and the crank-arms are connected with oscillating levers 20 by links 21 or other suitable connecting devices. In order to make these parts freely movable and substantially without friction, I prefer to form them with some well-known form of ball-and-socket joint or connection, which will include balls 22 on the outer ends of the levers and operating between socketed blocks 21', of any well-known type, mounted in links 21.

In Fig. 4 the dotted lines passing around the axle 3 and over the pulley-wheel 30 above it represent a simple and well-known arrangement by which power is transmitted by any well-known means to operate a governor, and in practice the valves 9 are intended to be controlled by some well-known form of governor (not shown) through a rod 25. Thus a lift or depression, as the case may be, of the rod 25 operates to move the valve of the driving-nozzle and the valve of the brake-nozzle simultaneously. In practice it should be understood that when the valve of the driving-nozzle is open that of the brake or retarding nozzle is closed, or vice versa, so that through the action of the governor on the rod 25 as the valve of the driving-nozzle is closed that of the brake-nozzle is correspondingly opened and the same amount of water is being discharged continuously from the reservoir, though with varying effects of power. By the simultaneous movement of the valves, as shown, compensation is made for the immense pressure that would otherwise suddenly be put upon the mains and reservoirs if the valves worked independently, though the time between the shut-off of one and the turning on of the other occupied but the fraction of a second. This feature of compensation and of controllable distribution of pressure, water, and power is the essence of my invention.

When the wheel is running, water is admitted through all of the driving-nozzles into the buckets of the wheel and the wheel is rotated by the impact of this water. The water escapes at each side of the wheel, which is open for that purpose in the usual manner of this class of wheels. When the wheel reaches the speed at which it is designed to run, the governor will commence to close the inlet-valve which controls one of the supply-passages and, acting through the connecting-levers, will correspondingly open the brake-valve, thus allowing water to enter through this valve to the nozzle 8, which, acting directly against the advancing wheel, retards its motion. As soon as the motion of the wheel is reduced or begins to fall below the desired rate of speed the position of the valves will be again changed by the action of the governor, and thus the speed can be maintained.

It will be manifest that other forms of valves may be used and that various connections between the governor and the valves may be employed without altering the character and operation of the device, which is also applicable to any class of pressure-wheels.

Having thus described my invention, what I claim as new, and desire to secure by Letters Patent, is—

1. The combination with a water-wheel, a nozzle through which water is delivered to propel the wheel, a second nozzle directed oppositely thereto, means for connecting said nozzles, valves for controlling the supply to said nozzles and controlling means connected with each valve and operating the valves to simultaneously open one and close the other.

2. The combination with a water-wheel, of a nozzle at one side of the wheel and through which water is supplied to propel the wheel, a second nozzle at the opposite side of the wheel to retard its motion, means for connecting the nozzles, valves within said nozzles, and means connected with each valve to simultaneously open one valve and close the other.

3. The combination with a water-wheel having peripheral buckets, of a nozzle through which water is projected to propel the wheel, a second nozzle opposing the first-named one and adapted to retard the movement of the wheel, means for connecting the nozzles, valves for controlling the admission of water to the nozzles, and means including fulcrumed levers and link connections between the valves and arranged to simultaneously open one valve and close the other.

4. In a motor the combination of a journal-shaft and a water-wheel having peripherally-attached buckets, an encircling reservoir, or supply-pipe, a nozzle attached thereto so as to discharge against these buckets and propel the wheel, and another nozzle in this reservoir so placed as to discharge oppositely against the wheel and retard its motion, valves within these nozzles, connections by which the valve of the driving-nozzle may be closed or opened simultaneously with the opening or closing of the valve of the retarding-nozzle, whereby as an amount of water is cut off by the movement of the valve at the driving-nozzle, a corresponding amount of water is discharged through the retarding-nozzle without extra strain upon the mains and reservoir and whereby the speed of the wheel and the power generated therefrom are regulated.

In witness whereof I have hereunto set my hand.

NEWTON LAMB.

Witnesses:
LOUIS NEHRBOSS,
J. A. WINSELL.